INVENTORS.
LEO STAMLER
JAMES J. HATTON

BY Leonard H. King
ATTORNEY

INVENTORS.
LEO STAMLER
JAMES J. HATTON

BY Leonard H. King
ATTORNEY nited States Patent Office 3,534,606
Patented Oct. 20, 1970

3,534,606
FUEL GAGE
Leo Stamler, Plainview, and James J. Hatton, Freeport, N.Y., assignors to Consolidated Airborne Systems, Inc., Carle Place, N.Y.
Filed May 20, 1968, Ser. No. 730,403
Int. Cl. G01f 23/00
U.S. Cl. 73—304
6 Claims

ABSTRACT OF THE DISCLOSURE

An unbalanced bridge capacitive type fuel gage, utilizing an operational amplifier with capacitive feedback of a portion of amplifier output, and an indicator operated by the amplifier.

This invention relates to the measurement of the mass or volume of a liquid in a vessel or tank. More specifically, it is concerned with the continuous, highly accurate and stable measurement of fuel quantity in aircraft fuel tanks. There is presented herein a simple, reliable technique for making these measurements, which eliminates many of the drawbacks of prior systems designed for this purpose.

BACKGROUND OF THE INVENTION

Virtually all accurate fuel gaging systems in present use for aircraft depend upon the measurement of the capacitance between two plates inserted in the fuel tanks, between which plates fuel is located. The capacitance value is utilized to measure the amount of fuel in the tank. Two basic methods of measuring this capacity have been used: one, the so-called "open-loop" method, displays the frequency of an oscillator circuit in which a capacitor is one member, for example, or displays the voltage across a bridge circuit in which the capacitor is part or all of one arm. The "closed loop" system, much more commonly used today because of its accuracy and long term stability, operates to mechanically rebalance a bridge in which the capacitor is part or all of one arm. By using the unbalanced output of the bridge to drive a motor which in turn drives a potentiometer to null the voltage at the bridge output, the position of the potentiometer arm is used as the output reading, calibrated in terms of fuel quantity.

The prior "open-loop" or "no-moving part" designs, that is, the designs without the servo rebalance system, have many distinct disadvantages. These include: nonlinear output, in which readings are difficult to make accurately over certain parts of the scale and displays are awkward; output a direct function of the gain of amplifiers ahead of the display; output critical with regard to stray amplifier inputs and changes in line impedances to the capacitances in the fuel tanks; system difficult to compensate for variations in dielectric constant and dissipation factor among fuel batches. The automatic rebalance system described above, and in most common use today, also has definite disadvantages, particularly when applied to aircraft fuel gaging; they employ moving parts in the form of motors and potentiometers, which are costly, heavy, and relatively unreliable in terms of present needs; they are subject to friction, sticking and dead spots; they are relatively critical with regard to changes in lead line impedances, primarily temperature-induced variations in cables to the fuel tanks. For these and other reasons, a system which reduces or eliminates these prior art disadvantages cited above, is needed for modern, high speed, highly reliable aircraft.

SUMMARY OF THE INVENTION

The fuel gage system described in the present invention utilizes only solid state components to present on a digital, or on a D'Arsonval type, display, an output linearly proportional to the percentage of fuel between capacitor plates in a fuel tank. The system incorporates a solid state converter or regulator depending upon the nature of the input voltage, variable capacitances and variable resistors which are adjusted for empty and full conditions, a solid state linear operational amplifier, a solid state demodulator, and, for the alternate condition of eliminating certain types of instabilities, a modulator circuit which is also solid state.

The features of the system of this invention include: no moving parts (except in certain embodiments for the display indicator itself), resulting in low cost, simplicity, and high reliability; low order dependence of accuracy on the amplifier gain; similarly, minimal dependence in output reading on changes in stray capacitance, conductive leakage and other random impedances; use of considerably less operating power; simple means of compensating for variation in dielectric constant and dissipation factor of the fuel; simple means of eliminating instabilities caused by drainage of the fuel from the feedback reference capacitance; further reduced dependence on supply voltage through a reference voltage applied as an amplifier gain control; and means for reducing quadrature voltages as a source of error.

The described invention therefore eliminates many of the drawbacks of prior systems, while retaining the accuracy and stability required of critical aircraft fuel gaging means.

It is an object of this invention to provide an accurate, stable gage of percentage of fluid in a tank, which does not require moving parts.

It is another object of the present invention to provide a fuel gage with a linear output reading versus percentage of fuel remaining, which is all solid state, simple, reliable and of low cost.

A further object of the present invention is to provide a simple fuel gage capable of being compensated for variations in the fuel such that the reading is accurate for mass or volume of fluid remaining.

Still another object of the present invention is to provide an accurate fuel gage which has no moving parts and has negligible dependence on the gain of the output amplifier.

These and other objects will become more fully apparent after reading a description of the figures in the preferred embodiment.

DESCRIPTION OF THE PREFERRED EMBODIMENT

Basic fuel gage

Figure 1A:
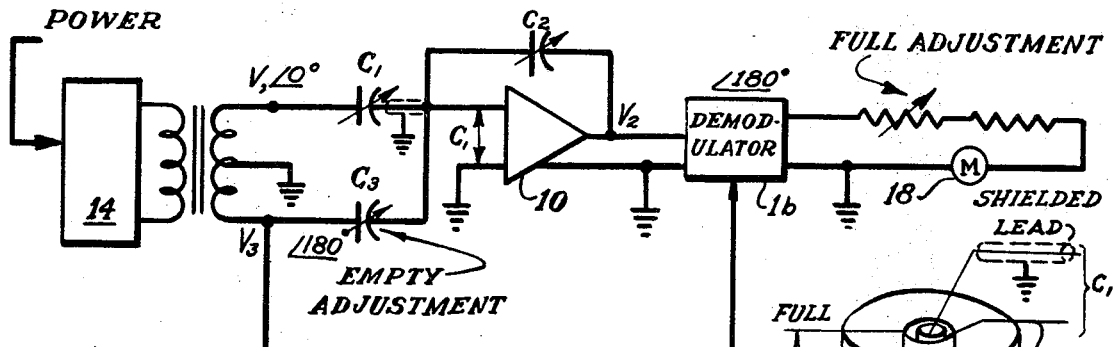
FIG. 1A is a schematic diagram of the basic circuit for the preferred invention.

Referring to FIG. 1A, the potential $V_1$ is applied to capacitor $C_1$, which represents the level sensing probe 30.

Figure 1B:
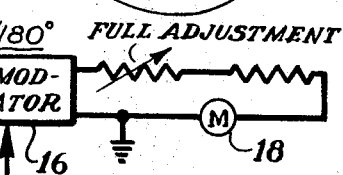
FIG. 1B is an isometric view of a simplified capacitance fuel gage in a cylindrical fuel tank, with percentage fully defined.

The value of $C_1$ is a function of the level sensed, and the dielectric constant of the fluid 32. It will be assumed that the capacitor $C_1$, although nominally consisting of a pair of coaxial cylinders 33 and 34, as shown in FIG. 1B, may consist of any suitable arbitrary shape; and has been so designed, so that the output capacitance is a function of the volume contained in the vessel 35, rather than merely a function of level. Thus the symbol $\phi$ is used to represent the normalized volume (fraction of the full volume) of the fluid in the container. For a dielectric constant of the fluid denoted as K, the value for $C_1$ is expressed as follows:

(1) $\qquad C_1 = \phi C_{1a} K + (1-\phi) C_{1a} + C_{1t}$ where $C_{1a}$ represents that portion of $C_1$ affected by the dielectric constant of the medium, whereas $C_{1t}$ represents that portion of the structure which is fixed in value and is not affected by the presence or absence of the fluid in the container. Such a component of capacitance is designed as the "terminal" or "dead" capacitance of the system. The portion of $C_{1a}$ covered by volume $\phi$ is multiplied by the fluid dielectric constant, whereas the uncovered portion $(1-\phi)C_{1a}$ is multiplied by the dielectric constant of air and vapor which is equal to unity $(K=1)$. The equation may be rearranged as:

(2) $\qquad C_1 = \phi C_{1a}(K-1) + C_{1a} + C_{1t}$ or (3) $\qquad C_1 = \phi C_{1a}(K-1) + C_{1e}$ where $C_{1a} + C_{1t} = C_{1e}$, the "empty" capacitance of $C_1$, thus when $\phi = 0$, $C_1 = C_{1e}$. $C_2$ is a feedback capacitor between the output of the linear, A.C. operational amplifier 10 and its input. Physically $C_2$ may be a fixed capacitor (for an "uncompensated" gage); or may be a dielectric sensing capacitor fully immersed in the fluid at all times (for a "compensated" gage).

The nodal equation for the sum of currents entering the amplifier input is given by Equation 4.

(4) $\qquad e_i \Sigma Y = (V_1 C_1 - V_3 C_3 - V_2 C_2) j\omega$ where $$\Sigma Y = j\omega (C_1 + C_2 + C_3) + G_i + Y_d$$

and $G_i$ is the input admittance of the amplifier, and $Y_d$ is the distributed admittance of the shielded wire, etc. Since $V_2 = e_i A$ (A is amplifier gain), we may rewrite (4) as:

(5) $\qquad \dfrac{\Sigma Y V_2}{A} = j\omega (V_1 C_1 - V_3 C_3 - V_2 C_2)$ or (6) $\qquad V_2 \left( \dfrac{\Sigma Y}{A} + j\omega C_2 \right) = (V_1 C_1 - V_3 C_3) j\omega$ If A is sufficiently large, we can neglect $\Sigma Y/A$ as insignificant when compared to $j\omega C_2$ and (6) reduces to Equation (7) $\qquad j\omega V_2 C_2 = j\omega (V_1 C_1 - V_3 C_3)$ The factor $j\omega$ cancels out and we may rewrite Equation 7 as (8):

(8) $\qquad V_2 = \dfrac{V_1 C_1 - V_3 C_3}{C_2}$

By substituting Equation 3 for $C_1$ in Equation 8 we obtain the relationship of $V_2$ as a function of volume $\phi$:

(9) $\qquad V_2 = \dfrac{V_1 [\phi C_{1a}(K-1) + C_{1e}] - V_3 C_3}{C_2}$

It is now observed that by varying $V_3$ or $C_3$, the product $V_3 C_3$ can be adjusted so that it is equal to $V_1 C_{1e}$, which is a fixed quantity. In FIG. 1A, $C_3$ is shown variable, but one can readily arrange for $V_3$ to be adjustable. With this adjustment accomplished ("empty adjustment") Equation 9 reduces to (10):

(10) $\qquad V_2 = \left[ \dfrac{V_1 C_{1a}(K-1)}{C_2} \right] \phi$ where $V_2$ is dependent directly on volume $\phi$ for a constant dielectric K. For emphasis, it is pointed out that $V_1$, $C_{1a}$, and $C_2$ are constant. $V_2$ then is the basic response of the system to volume, where error due to the variation of K is ignored, whereupon the circuit is referred to as an "uncompensated-gravimetric system."

Primary power may consist of either an A.C. source or a D.C. source. Power required is on the order of one watt, compared to six to ten watts in servo-type gages. If an A.C. source is available, and it is desired to utilize it directly, it will be necessary to process it through a regulator 14, which typically may consist of an amplifier, rectifier, Zener reference, and a feedback loop that applies the measured amplitude variation from reference as a gain control to the amplifier. Such a regulator can provide a stable sinusoidal output that is independent of line and load fluctuation. If a D.C. power source is to be used, the input power is processed through a Zener preregulator, an inverter and additional regulation of the A.C. bridge potentials, if necessary. The frequency of operation is arbitrary, although the choice of a frequency asynchronous with ambient power frequencies enjoys some advantages when synchronous detection is used for the demodulator. It will be seen that the bridge conditions provide an output signal which is independent of frequency and therefore of waveform as well. Although not limited to a sine-wave or square-wave, it will be found that either one or the other will be found most convenient and economical as a bridge excitation source.

Where an "inverter" is required, the use of a stabilized sine-wave oscillator and buffer amplifier, or a square wave power oscillator utilizing a square-hysteresis-loop transformer in a conventional circuit are entirely suitable. In the case of the square-wave generator, additional regulation of the bridge signal is easily achieved by the use of Zener regulators as clippers. Other means of clipping at a fixed level may also be used.

Depending on the desired accuracy and degree of nonlinearity that is tolerable for a given installation, the demodulator 16 may consist of an ordinary amplitude detector consisting of one or more diodes in a standard rectifier configuration; or, a synchronous demodulator may be used which will provide immunity to asynchronous noise and rejection of signal frequency of phase in quadrature with the applied reference excitation. In addition, the use of the synchronizing scheme avoids the nonlinearity inherent in the characteristics of diodes used as straight rectifiers. For a high performance system therefore, the synchronous detector is preferable if not mandatory.

The display 18 may be of a solid state voltage readout, or any D'Arsonval or ratiometer meter-type movement. Although the use of a "taut-band" suspension has been projected for use with the present configuration, it is not a necessary condition. Sufficient dial swing should be provided to give the desired resolution. Meter sensitivity is governed by the output power available from the amplifier. By providing more than sufficient output at $V_2$ to drive the meter-movement to full scale, a "full-adjustment" may be provided by the simple expedient of a series trimmer adjustment as shown in FIGS. 1A, 2A, 3 and 4.

Compensated mass reading gage

By the use of statistical knowledge relating dielectric-constant to density, the fully immersed capacitor $C_2$ can be combined with an external fixed padder to provide a "compensated-gravimetric" gage which incorporates an equation expressing the mean statistical relationship between "dielectric-index" $(K-1)$ and density D. This is expressed by the equation:

(11) $\qquad \dfrac{K-1}{D} = a[1 + b(K-1)]$ where $a$ and $b$ are specified differently for different types of fuels.

If in the circuit of FIG. 1a, $C_2$ is assumed to be an open structure totally immersed in the fluid being measured, at all times, then it may be used as a means for correcting the errors due to dielectric constant. The type of compensation under consideration here is one that will cause the response $V_2$ to be a measure of the mass of fluid in the container.

Under conditions of complete immersion, the value of capacitance measured at the terminals of capacitor $C_2$ is expressed by the following formula:

(12) $$C_2 = C_{2a}K + C_{2t}$$

where $C_{2a}$ is that portion of the capacitor subject to change as a result of immersion in dielectric fluid of constant K, and $C_{2t}$, that portion unaffected by immersion. If we add and subtract $C_{2a}$ from the right-hand side of the equation, the result:

(13) $$C_2 = C_{2a}K - C_{2a} + C_{2a} + C_{2t}$$

is valid, and can be reconstructed as follows:

(14) $$C_2 = C_{2a}(K-1) + C_{2e}$$

where $C_{2e} = C_{2a} + C_{2t}$ is the value of the empty or "dry" capacitance of $C_2$. We now factor out $C_{2e}$, to obtain:

(15) $$C_2 = C_{2e}\left[1 + \frac{C_{2a}}{C_{2e}}(K-1)\right]$$

The resemblance of the right-hand side of this equation to the right-hand side of Equation 11 is duly noted, and Equation 15 is substituted for $C_2$ in Equation 10 to obtain:

(16) $$V_2 = \frac{V_1 C_{1a}(K-1)\phi}{C_{2e}\left[1 + \frac{C_{2a}}{C_{2e}}(K-1)\right]}$$

By padding the immersed capacitor with additional fixed, lumped capacitance, the value of $C_{2e}$ can be adjusted without affecting $C_{2a}$. It may therefore be chosen so that the ratio $C_{2a}/C_{2e} = b$ in Equation 11. Thus Equation 16 may be rewritten as:

(17) $$V_2 = \frac{V_1 C_{1a}(K-1)\phi}{C_{2e}\frac{(K-1)}{aD}} = \frac{aV_1C_1a\phi D}{C_{2e}}$$

or

(18) $$V_2 = \left[\frac{aV_1C_1a}{C_{2e}}\right]m, \text{ where } m = \phi D$$

which provides an output $V_2$ which is a direct function of mass $m$ of the fluid contained in the vessel. Assuming perfect instrumentation, the remaining errors are those due to the deviation of any sample of fuel in use, from the nominal statistical relationship expressed by Equation 11.

Compensated volume reading gage

Figure 2A:
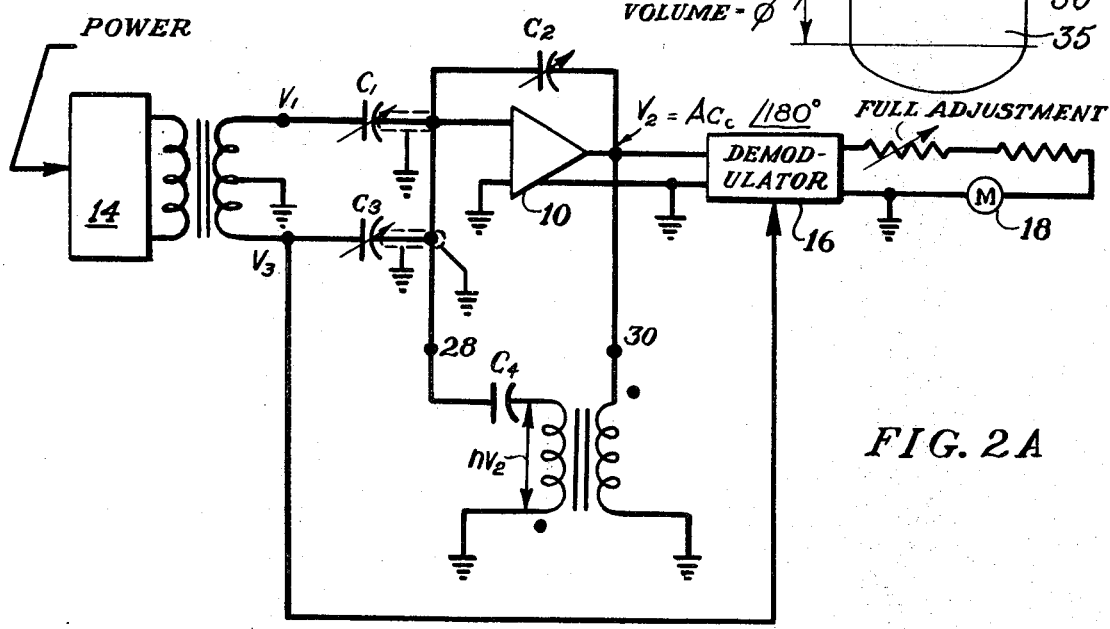
FIG. 2A is a schematic diagram of the basic circuit modified to allow a reading of volume with compensation for dielectric constant variation.

If the circuit of FIG. 1A is modified as shown in FIG. 2A, then the new equation for the sum of the currents entering the amplifier A is expressed by Equation 19:

(19) $$e_1 \Sigma Y = (V_1C_1 - V_3C_3 - V_2C_2 + nV_2C_4)j\omega$$

Figure 2B:
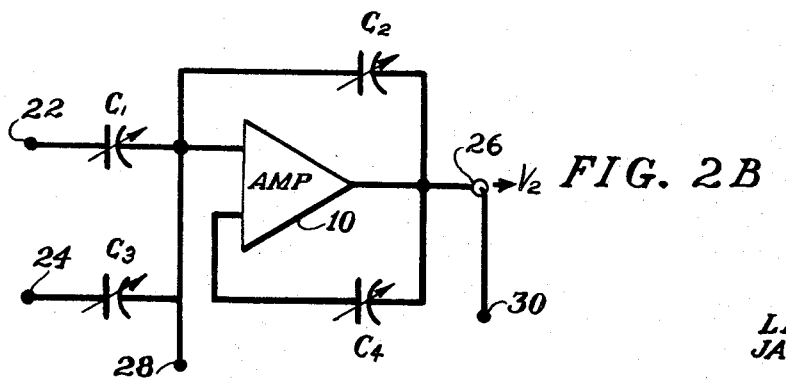
FIG. 2B is an alternate to the transformer shown in FIG. 2A.
Figure 3:
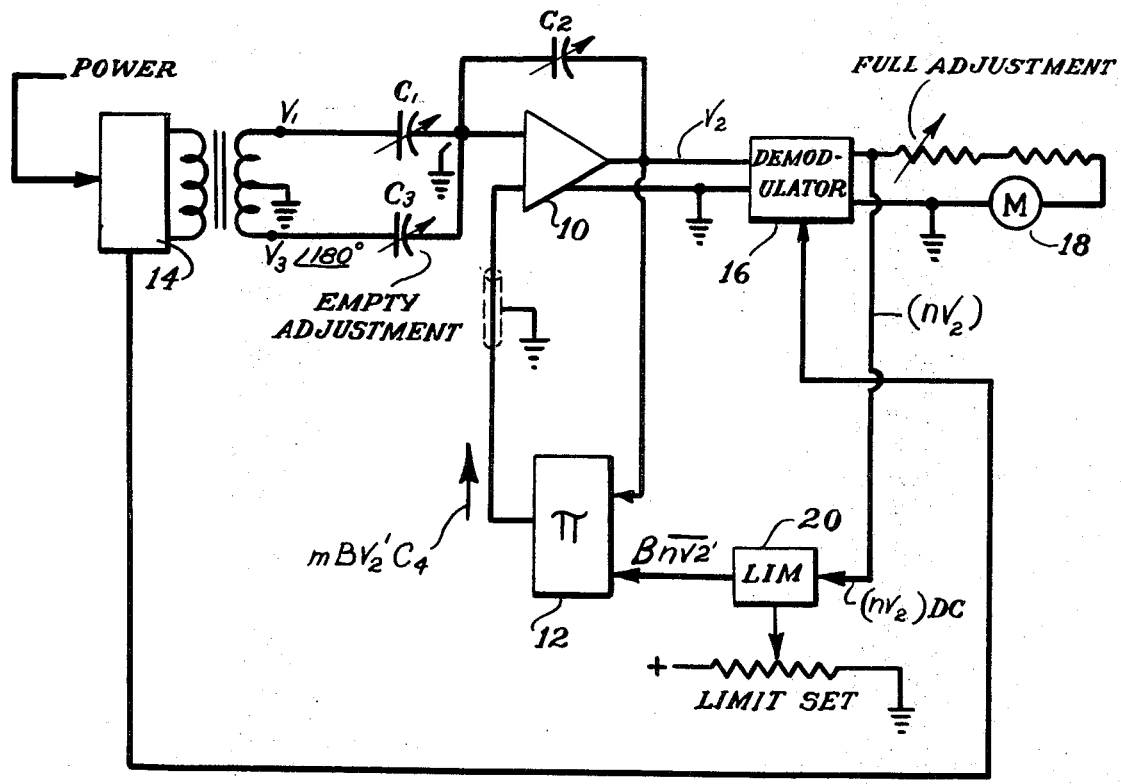
FIG. 3 is a schematic diagram showing the basic circuit as modified to be a compensated volumetric fuel gage, without instability if the feedback capacitor becomes uncovered with fuel.
Figure 4:
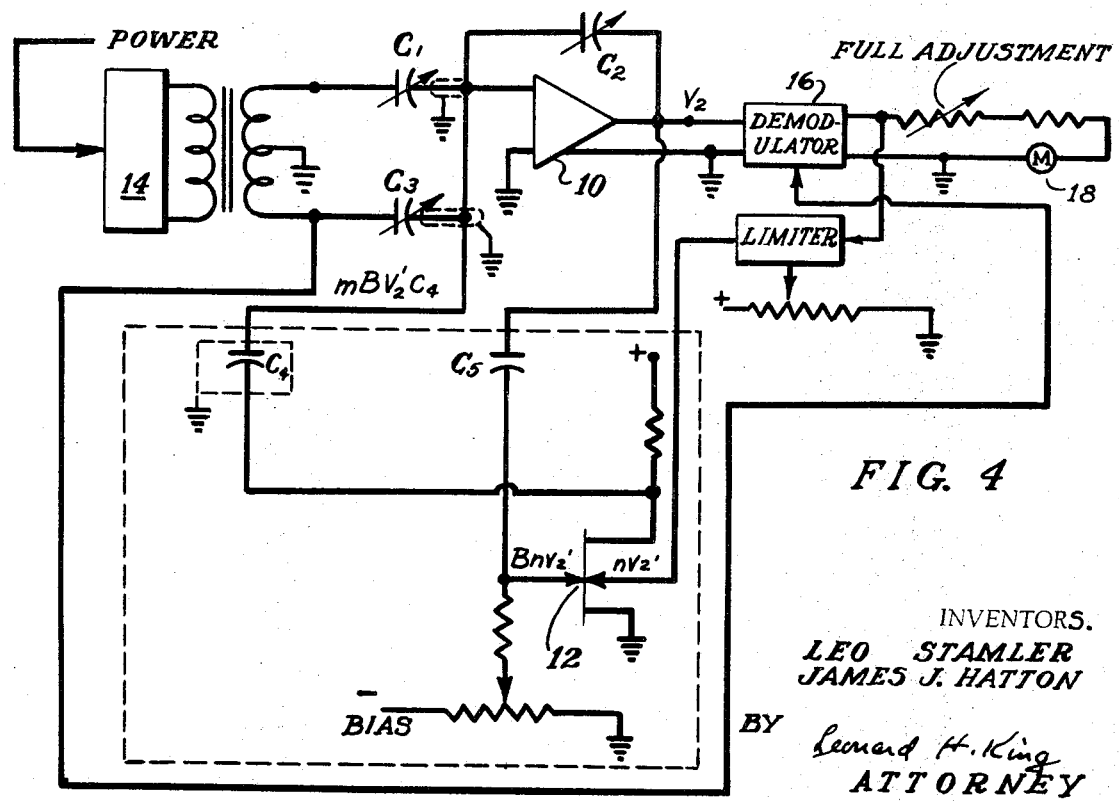
FIG. 4 is a schematic as in FIG. 3, but including the details of one possible modulator circuit.

The difference between the circuits of FIG. 1A and FIG. 2A is the introduction of an additional capacitor $C_4$ (which is preset to a particular value which will be determined in the discussion to follow) and a means of inverting the output potential $V_2$, symbolized in this example by a transformer of fixed ratio $1:n$. Other means for accomplishing the same end will become apparent to those versed in the art, but such other means will not change the principle postulated. An example of such alternate means is the use of a differential amplifier for A, and the direct connection of $C_4$ between the output potential $V_2$ and the non-inverting input of A, as shown in FIG. 2B in which the circuit between terminals 22, 24 and 26 are replaced as in FIG. 2B, and terminals 28 and 30 are left open. In either case, it will be shown that either $nV_2$ or $C_4$ can be adjusted to provide the desired result.

Once again, $e_1$ may be replaced by the value $V_2/A$ and the equation solved for $V_2$:

(20) $$\frac{V_2}{A}\Sigma Y = [V_1C_1 - V_3C_3 - V_2(C_2 - nC_4)]j\omega$$

(21) $$V_2\left[\frac{\Sigma Y}{A} + j\omega(C_2 - nC_4)\right] = j\omega(V_1C_1 - V_3C_3)$$

and

(22) $$V_2 = \frac{j\omega(V_1C_1 - V_3C_3)}{\Sigma Y/A + j\omega(C_2 - nC_4)}$$

where, $\Sigma Y/A$ has the same significance as it had in Equation 4. For sufficiently large gain A, $\Sigma Y/A$ can be neglected in comparison to the value of $j\omega(C_2 - nC_4)$ and Equation 22 reduces to:

(23) $$V_2 = \frac{V_1C_1 - V_3C_3}{C_2 - nC_4}$$

Substituting the values for $C_1$ and $C_2$ expressed by Equations 3 and 14, respectively, Equation 23 becomes:

(24) $$V_2 = \frac{V_1[\phi C_{1a}(K-1) + C_{1e}] - V_3C_3}{C_{2a}(K-1) + C_{2e} - nC_4}$$

Once again we adjust $V_3C_3$ so that it is equal to $V_1C_{1e}$, and in addition we adjust $nC_4$ so that it is equal to $C_{2e}$, whereupon:

(25) $$V_2 = \frac{V_1C_{1a}(K-1)\phi}{C_{2a}(K-1)}$$

where under the proviso that $K - 1 \neq 0$ (requiring that the compensator remain covered), this expression reduces to:

(26) $$V_2 = \left[\frac{V_1C_{1a}}{C_{2a}}\right]\phi$$

and the output $V_2$ is seen to be independent of dielectric constant, and to be a direct function of volume, which is the desired result.

Compensated volume reading gage with uncovered compensator

In the event that progressive uncovering of the compensator $C_2$ takes place, the factor $(K-1)$ in the numerator and denominator approach zero simultaneously $(K=1)$ for empty probe and compensator, and Equation 25 becomes indeterminate, and Equation 26 becomes invalid. The physical effect is an erroneous output reading, depending on the vagaries of pickup and other extraneous effects. A means for preventing the indeterminant condition from arising is presented in FIG. 3. The demodulated output $(nV_2)'$ (a D.C. potential proportional to $V_2$) is applied to a limiter 20 in addition to the D'Arsonval meter readout. The factor $n$ in $(nV_2)'$ is a proportionality constant which encompasses the effects of attenuation (or gain) through the demodulator as well as the constant form-factor of $V_2$. The limiter passes the demodulated output to the modulator without effect except for clamping it to the value $\overline{(nV_2)'}$ for such values of $\phi' \geq 1$, where $\phi'$ is the fraction of the volume required to cover the compensator, i.e., when $\phi'=1$ the compensator is completely covered. If we define a variable $\beta$, such that $\beta = (nV_2)'/\overline{(nV_2)'}$ then over the range $0 \leq \phi' \leq 1$, $\beta$ varies over the range $0 \leq \beta \leq 1$. The block 12 is a modulator, where the variable $\beta\overline{(nV_2)'}$ operates on the current due to A.C. potential $V_2$ applied to a capacitor $C_4$. The new constant factor $m$ represents the number of "VC units" of A.C. output current change which is realized for each volt of applied D.C. voltage from the limiter. The purpose in presenting the modulation process in this manner is to emphasize that regardless of the method chosen for accomplishing this function, the scheme derived is valid. Various approaches are those that use the limiter output to operate on $V_2$ alone, $C_4$ alone, or on the $V_2C_4$ product (variable gain, constant current amplifier).

The current component $m\beta V_2 C_4$ may be combined with the other components of the bridge by applying it, as shown to the noninverting input of a differential operational amplifier; or by the use of a phase-inverting device, designed into any part of the control loop, it can be summed into the inverting input of a single-ended operational amplifier. In either case, the equation for the input currents to the amplifier is given by Equation 27:

(27) $\quad e_i \Sigma Y = V_1 C_1 - V_3 C_3 - V_2 C_2 + m\beta V_2 C_4$ and since $V_2 = e_i A$,

(28) $\quad V_2 = \dfrac{V_1 C_1 - V_3 C_3}{\Sigma Y/A + C_2 - m\beta C_4}$ where for $\Sigma Y/A \ll (C_2 - m\beta C_4)$

(29) $\quad V_2 = \dfrac{V_1 C_1 - V_3 C_3}{C_2 - m\beta C_4}$ for the region $0 \leq \phi' \leq 1$,

(30) $\quad C_2 = \phi' C_{2a}(K-1) + C_{2e}$ and

(31) $\quad C_1 = \phi C_{1a}(K-1) + C_{1e}$

Substitution of these values in (29), and adjusting $V_3 C_3$ to equal $V_1 C_{1e}$, yields:

(32) $\quad V_2 = \dfrac{V_1 C_{1a}(K-1)\phi}{\phi' C_{2a}(K-1) + C_{2e} - m\beta C_4}$ For the case where the dielectric constant takes on a nominal value of $K_N$:

(33) $\quad V_2 = \dfrac{V_1 C_{1a}(K_N - 1)\phi}{\phi' C_{2a}(K_N - 1) + C_{2e} - m\beta C_4}$ It is desirable for the denominator to have a common factor $(K_N - 1)$, so that it may cancel out with the factor $(K_N - 1)$ in the numerator, therefore we set up the following conditions.

Let:

(34) $\quad C_{2e} = mC_4 = C_{2a}(K_N - 1)$

Then:

(35) $\quad V_2|_{K=K_N} = \dfrac{V_1 C_{1a}(K_N - 1)\phi}{C_{2a}(K_N - 1)(\phi' + 1 - \beta)}$ If $\phi' + 1 - \beta$ is constrained so that $\phi' + 1 - \beta = 1$, then:

(36) $\quad V_2|_{K=K_N} = \dfrac{V_1 C_{1a}(K_N - 1)\phi}{C_{2a}(K_N - 1)} = \dfrac{V_1 C_{1a}\phi}{C_{2a}}$ which is the desired result. Note that cancellation of $(K_N - 1)$ from numerator and denominator is valid since it is a finite quantity (e.g., $K_N = 2.090$ for JP-4 fuel) and for the constraint postulated $\phi' = \beta$; therefore, the general Equation 32 can be rewritten including all of the foregoing conditions for the denominator.

(37) $\quad V_2 = \dfrac{V_1 C_{1a}(K-1)\phi}{\phi' C_{2a}(K-1) + C_{2a}(K_N - 1) - \phi' C_{2a}(K_N - 1)}$ or

(38) $\quad V_2 = \dfrac{V_1 C_{1a}(K-1)\phi}{C_{2a}[\phi'(K - K_N) + (K_N - 1)]}$ It will be noted that when the compensator is covered $\phi' = 1$, and (38) reduces to:

(39) $\quad V_2 = \dfrac{V_1 C_{1a}(K-1)\phi}{C_{2a}(K-1)} = \dfrac{V_1 C_{1a}\phi}{C_{2a}}$ yielding the desired relationship, where $V_2$ is a function of $\phi$ only, and is independent of K.

Also, as $\phi'$ approaches zero, the value of $V_2$ approaches:

(40) $\quad V_2 = \dfrac{V_1 C_{1a}(K-1)\phi}{C_{2a}(K_N - 1)}$ which remains a finite quantity as K approaches unity, thus preventing runaway (indeterminate) conditions.

While a transformer is shown as part of the bridge circuit, any source of oppositely phase voltages, whose magnitude and magnitude ratio, with respect to a common reference point is stable, may be used as a voltage source for the bridge. By way of example, a multivibrator may be used for this purpose.

There has been disclosed heretofore the best embodiment of the invention presently contemplated and it is to be understood that various changes and modifications may be made by those skilled in the art without departing from the spirit of the invention.

What we claim as new and desire to secure by Letters Patent is:

1. A capacitance-type liquid volume gage for a liquid including a compensator capacitor employing the liquid as a dielectric comprising:
   (a) a transformer having a center-tapped secondary winding, the centertap being connected to a reference ground, said centertapped secondary winding forming two arms of a bridge circuit;
   (b) a stable signal source arranged to energize said transformer;
   (c) a two-plate measuring capacitor immersed in the liquid in said container to an extent depending upon the level thereof, the reactance of said measuring capacitor being a function of the level and of the dielectric constant of said liquid, said measuring capacitor having one plate connected to one end of said centertapped secondary, forming a third arm of said bridge circuit;
   (d) a two-plate reference capacitor having one plate connected to the other end of said center-tapped secondary, forming a fourth arm of said bridge circuit, the other plates of said measuring capacitor and said reference capacitor being connected in a common junction;
   (e) a differential operational amplifier having the first input circuit connected between said common junction and said center tap whereby there is applied to the input of said operational amplifier an A.C. voltage which is dependent upon the difference in capacitance between said measuring capacitor and said reference capacitor;
   (f) a demodulator arranged to receive the output of said operational amplifier;
   (g) a limiter connected to the output of said demodulator;
   (h) a modulator connected to the output of said limiter and the output of said differential operational amplifier, the output of said modulator being fed to the second input of said differential operational amplifier;
   (i) a two-plate compensating capacitor connected between the output and the input of said operational amplifier for feeding back, to said input, a portion of the amplifier output voltage wherein said capacitor employs the liquid whose level is to be measured as the dielectric; and
   (j) an indicator connected to the output of said demodulator responsive to the output of said demodulator for indicating the quantity of liquid.

2. A capacitance-type liquid volume gage for a liquid including a compensator capacitor employing the liquid as a dielectric comprising:
   (a) a transformer having a center-tapped secondary winding for energization with a stable signal voltage, said center tap being connected to a refence ground, said center-tapped secondary winding forming two arms of a bridge circuit;
   (b) a two-plate measuring capacitor immersed in the liquid in said container to an extent depending upon the level thereof, the reactance of said measuring capacitor being a function of the level and of the dielectric constant of said liquid, said measuring capacitor having one plate connected to one end of said center-tapped secondary, forming the third arm of said bridge circuit;

(c) a two-plate reference capacitor having one plate connected to the other end of said center-tapped secondary, forming the fourth arm of said bridge circuit, the other plates of said measuring capacitor and said reference capacitor being connected in a common junction;

(d) an operational amplifier having its input circuit connected between said common junction and said center tap whereby there is applied to the input of said operational amplifier an A.C. voltage which is dependent upon the difference in capacitance between said measuring capacitor and said reference capacitor;

(e) a demodulator arranged to receive the output of said operational amplifier;

(f) a limiter connected to the output of said demodulator;

(g) a modulator connected to the output of said limiter and the output of said operational amplifier, the output of said modulator being fed to said bridge circuit;

(h) a two-plate compensating capacitor connected between the output and the input of said operational amplifier for feeding back, to said input, a portion of the amplifier output voltage wherein said capacitor employs the liquid whose level is to be measured as the dielectric; and (i) an indicator connected to the output of said demodulator responsive to the output of said demodulator for indicating the quantity of liquid.

3. The apparatus of claim 1 including a circuit for synchronizing said demodulator with the voltage applied to said bridge.

4. The apparatus of claim 2 including a circuit for synchronizing said demodulator with the voltage applied to said bridge.

5. A capacitance-type liquid quantity gage for a liquid comprising:

(a) a transformer having a center-tapped secondary winding for energization with a stable signal voltage, said center tap being connected to a reference ground, said center-tapped secondary winding forming two arms of a bridge circuit;

(b) a two-plate measuring capacitor immersed in the liquid in said container to an extent depending upon the level thereof, the reactance of said measuring capacitor being a function of the level and of the dielectric constant of said liquid, said measuring capacitor having one plate connected to one end of said center-tapped secondary, forming the third arm of said bridge circuit;

(c) a two-plate reference capacitor having one plate connected to the other end of said center-tapped secondary, forming the fourth arm of said bridge circuit, the other plates of said measuring capacitor and said reference capacitor being connected in a common junction;

(d) an operational amplifier having its input circuit connected between said common junction and said center tap whereby there is applied to the input of said operational amplifier an A.C. voltage which is dependent upon the difference in capacitance between said measuring capacitor and said reference capacitor;

(e) a demodulator arranged to receive the output of said operational amplifier;

(f) a transformer having a primary winding connected to the output of said amplifier;

(g) a coupling capacitor connected between a selected end of the secondary winding of said transformer and the input of said amplifier, said selected end being such as to provide a voltage to coupling capacitor which is out of phase with the input to said transformer;

(h) a two-plate compensating capacitor connected between the output and the input of said operational amplifier for feeding back, to said input, a portion of the amplifier output voltage wherein said capacitor employs the liquid whose level is to be measured as the dielectric; and (i) an indicator connected to the output of said demodulator responsive to the output of said demodulator for indicating the quantity of liquid.

6. The apparatus of claim 5 including a circuit for synchronizing said demodulator with the voltage applied to said bridge.

References Cited
UNITED STATES PATENTS

| | | |
|---|---|---|
| 2,908,166 | 10/1959 | Johnson. |
| 3,237,178 | 2/1966 | Valentine _____ 340—200 X |
| 3,339,412 | 9/1967 | Maltby. |

S. CLEMENT SWISHER, Primary Examiner